(12) United States Patent
Li et al.

(10) Patent No.: US 8,934,596 B2
(45) Date of Patent: Jan. 13, 2015

(54) METHODS AND APPARATUSES FOR SYNCHRONIZATION OF WIRELESS DEVICES IN WIRELESS NETWORKS

(75) Inventors: Junyi Li, Chester, NJ (US); Hua Wang, Bridgewater, NJ (US); Thomas J. Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 600 days.

(21) Appl. No.: 13/116,297

(22) Filed: May 26, 2011

(65) Prior Publication Data

US 2012/0134456 A1 May 31, 2012

Related U.S. Application Data

(60) Provisional application No. 61/387,430, filed on Sep. 28, 2010.

(51) Int. Cl.
*H04L 7/00* (2006.01)
*H04B 1/38* (2006.01)
*H04W 56/00* (2009.01)
(Continued)

(52) U.S. Cl.
CPC ............ *H04W 56/00* (2013.01); *H04W 56/002* (2013.01); *H04W 52/0216* (2013.01); *H04L 69/28* (2013.01)
USPC .......................................... 375/356; 375/219

(58) Field of Classification Search
CPC ................... H04W 52/0216; H04W 52/0219; H04W 56/00; H04W 56/001; H04W 56/002; H04W 76/02; H04W 84/18; H04L 69/28; Y02B 60/50
USPC .......... 375/219, 222, 260, 267, 299, 354, 356
See application file for complete search history.

(56) References Cited

U.S. PATENT DOCUMENTS

| 7,392,053 | B1 | 6/2008 | Conner et al. |
| 7,400,894 | B2 | 7/2008 | Ebner et al. |
| 2003/0016732 | A1* | 1/2003 | Miklos et al. ................. 375/132 |

(Continued)

FOREIGN PATENT DOCUMENTS

| EP | 1898560 A1 | 3/2008 |
| WO | 03/009608 A2 | 1/2003 |
| WO | WO2005064863 | 7/2005 |

OTHER PUBLICATIONS

International Search Report and Written Opinion—PCT/US2011/053521—ISA/EPO—Mar. 1, 2012.

(Continued)

*Primary Examiner* — David B. Lugo
(74) *Attorney, Agent, or Firm* — Linda G. Gunderson

(57) ABSTRACT

To maintain a synchronized wireless peer group, timing signals may be periodically transmitted by one or more devices in the wireless peer group. These periodic timing signals may be transmitted by different wireless devices in the peer group, distributing (sharing) the transmit power burden among the different wireless devices, increasing the useful operation time of the individual wireless devices. Similarly, the wireless peer group may monitor for timing signals received from devices that are not part of the wireless peer group. This monitoring burden may also be distributed (shared) among the devices in the peer group allowing for a greater sleep time for individual wireless devices, increasing the useful operation time of the individual wireless devices.

15 Claims, 9 Drawing Sheets

(51) Int. Cl.
*H04W 52/02* (2009.01)
*H04L 29/06* (2006.01)

(56) References Cited

U.S. PATENT DOCUMENTS

| | | |
|---|---|---|
| 2007/0174465 A1 | 7/2007 | Huang et al. |
| 2008/0095126 A1 | 4/2008 | Mahany et al. |
| 2009/0016320 A1 | 1/2009 | Li et al. |
| 2010/0008273 A1 | 1/2010 | Stocks |
| 2010/0172275 A1 | 7/2010 | Wu et al. |
| 2011/0076950 A1* | 3/2011 | Pope .......................... 455/41.3 |

OTHER PUBLICATIONS

Partial International Search Report—PCT/US2011/053521—ISA/EPO—Dec. 13, 2011.
Sun et al., "Secure and Resilient Time Synchronization in Wireless Sensor Networks", pp. 347-367.

* cited by examiner

METHODS AND APPARATUSES FOR SYNCHRONIZATION OF WIRELESS DEVICES IN WIRELESS NETWORKS

CROSS REFERENCE TO RELATED APPLICATIONS

The present Application for Patent claims priority to Provisional Application Ser. No. 61/387,430, entitled "Methods and Apparatus for Synchronization between Groups of Devices in Wireless Networks", filed on Sep. 28, 2010, which is hereby incorporated in its entirety by reference.

BACKGROUND

1. Field

The invention relates to wireless devices. More particularly, the invention relates to wireless devices that are capable of synchronizing with other wireless devices.

2. Background

In some networks, wireless devices derive timing information from an external time source, for example, the Global Position System (GPS). However, the external time source may not always be available to a wireless device. For example, the wireless device may be located indoors and may not be able to derive timing information from GPS. When an external time source is unavailable, a plurality of collocated wireless devices may form a peer group. The peer group may have a group lead that periodically transmits a local timing signal allowing the wireless devices in the peer group to synchronize their clocks with the lead and communicate with each other synchronously.

These local timing signals, however, will not match the timing signals of other peer groups. To communicate synchronously with another device in the peer group, a wireless device must first receive the local timing signal and then synchronize with the local timing signal. Thus it is important that the group lead transmit a robust and regular timing signal. This places a large synchronization energy burden on the group lead. In addition, it is important that wireless devices in the peer group regularly monitor the timing signal to maintain synchronization. This places a synchronization energy burden on each of the devices in the peer group.

Accordingly, there is a need for apparatuses and methods that reduce the synchronization energy burden for wireless devices that use local timing. Aspects of the invention address this need as well as other needs.

SUMMARY

In one exemplary embodiment, a method for synchronizing a first wireless device with a peer group comprises receiving at the first wireless device a first timing signal transmitted at a first transmission rate from a second wireless device, the second wireless device being in the peer group synchronizing the first wireless device with the peer group using the received first timing signal; and transmitting from the first wireless device a second timing signal, the second timing signal having a second transmission rate, the second transmission rate being lower than the first transmission rate.

In another exemplary embodiment a method for synchronizing a first device with a peer group, comprises sleeping at a first sleep rate and waking periodically to search for a first timing signal; receiving the first timing signal transmitted from a second device, the second device being in the peer group; synchronizing the first device with the peer group using the received first timing signal; sleeping at a second sleep rate, the second sleep rate being longer than the first sleep rate; and waking periodically to search for a second timing signal.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Methods and apparatus that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Figure 1:
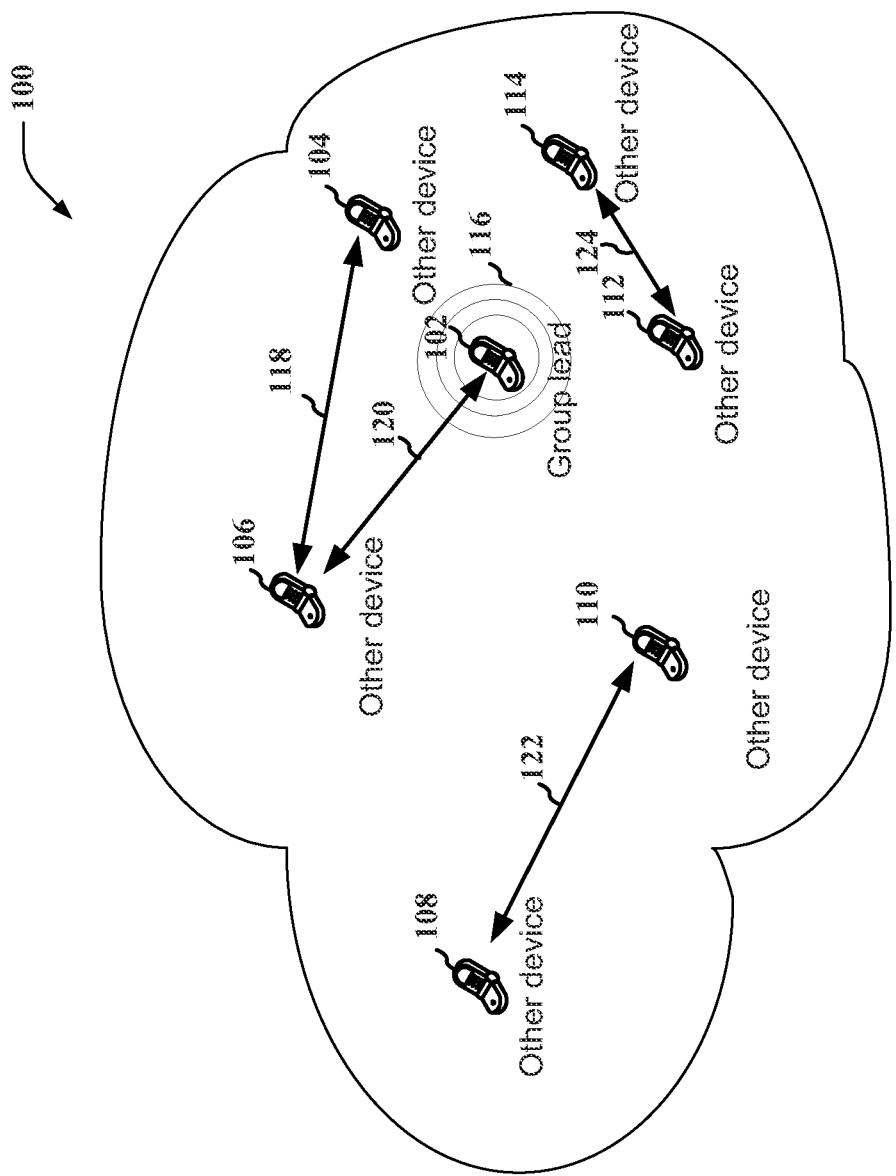
FIG. 1 shows a wireless peer group in accordance with an exemplary embodiment.

FIG. 1 shows an exemplary wireless peer group 100. In this embodiment, the wireless peer group 100 includes a group lead 102 as well as other devices 104, 106, 108, 110, 112, 114. Group lead 102 transmits a timing signal 116. The other devices 104, 106, 108, 110, 112, 114 receive the timing signal 116 and establish and communicate through synchronous wireless links. For example, device 104 and device 106 communicate through a first synchronous wireless link 118; device 102 and device 106 communicate through link a second synchronous wireless link 120; device 108 and 110 communicate through link a third synchronous wireless link 122; and device 112 and 114 communicate through link a third synchronous wireless link 124.

The group lead 102 may periodically transmit the timing signal 116 signal allowing each of the other devices 104, 106, 108, 110, 112, 114 to achieve and maintain synchronization with all of the other devices 104, 106, 108, 110, 112, 114 in the wireless peer group 100. Synchronization allows the other devices 104, 106, 108, 110, 112, 114 to communicate with each other via synchronous communication links such as the first synchronous wireless link 118, the second wireless synchronous communication link 120, the third synchronous wireless communication link 122 and the fourth wireless synchronous communication link 124.

In this embodiment, the wireless devices in the wireless peer group 100 communicate using a peer-to-peer protocol. The wireless devices may receive the timing signal 116, synchronize with the timing signal 116, set up communication links and transmit over those links according to any synchronous communication protocol. Synchronous protocols generally allow for more efficient use of the available spectrum and allow devices to more precisely schedule transmission and receive times. This allows the devices to sleep during inactive periods preserving device power and battery life.

In one exemplary embodiment, the wireless devices in the wireless peer group 100 transmit a peer discovery signal at a higher power or with more energy than it nominally transmits data. This allows for a larger discovery signal footprint and enables devices outside the wireless peer group 100 to discover peer devices more easily. The peer discovery signals may allow devices outside the wireless peer group 100 to more easily discover wireless devices in the peer group alerting them that they may want to attempt to receive a timing signal from the group lead 102.

In other embodiments, the wireless devices in the wireless peer group 100 may communicate using a hierarchical protocol. In some of these embodiments, the group lead 102 or other platform may coordinate data traffic, manage spectrum usage, determine data link pairings or otherwise manage access and use of the air medium.

Figure 2:
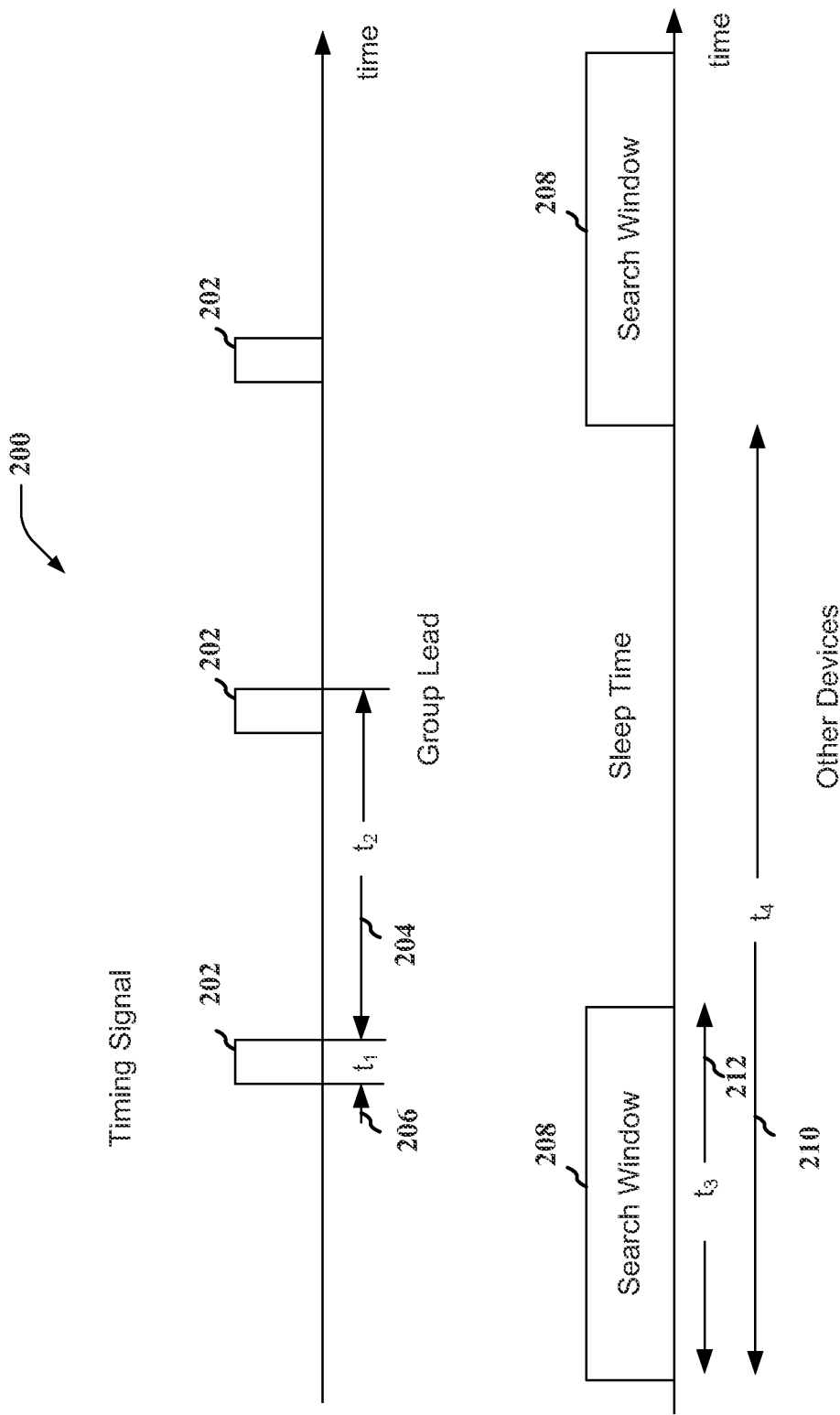
FIG. 2 shows a timing diagram for achieving and maintaining local synchronization in accordance with an exemplary embodiment.

FIG. 2 shows an exemplary timing diagram 200 for achieving and maintaining local synchronization. A group lead periodically transmits a periodic timing signal 202 having a transmit period of $t_2$ 204 and a transmit duration of $t_1$ 206. Other devices may monitor for the periodic timing signal 202 using a periodic search window 208 having a search period $t_4$ 210 and a search duration $t_3$ 212.

In one exemplary embodiment, local synchronization is achieved and maintained as follows. The devices in the wireless peer group 100 select a group lead 102. The device selected may be for example the first device in the wireless peer group 100 that is powered up. The group lead 102 then broadcasts a timing signal 116 such as the periodic timing signal 202 shown in FIG. 2. The periodic timing signal 202 may be generated using the group lead's internal clock.

The other devices 104, 106, 108, 110, 112, 114, search for the periodic timing signal 202 during the search window 208 and then synchronize with the periodic timing signal 202. It can be appreciated that to insure successful detection of the periodic timing signal during any search window 208, the other devices 104, 106, 108, 110, 112, 114 may set the length of their respective search windows 208 to a length that is longer than the sum of the transmit period $t_2$ 204 and the transmit duration $t_1$ 206 of the timing signal (i.e. $t_4 \geq t_2 + t_1$).

Those skilled in the art will recognize that there are performance trade-offs in the design and operation of the timing signal and the design and operation of the search window. For example, if the group lead 102 reduces the transmit period 204 of the periodic timing signal 202 to save transmit power, the other devices searching for the periodic timing signal 202 may need to compensate by increasing their search duration $t_3$ 212 increasing the power required for searching. Of course, the search period $t_4$ 210 may be reduced saving receiver power but the reduced search period may result in a longer delays in achieving synchronization.

Figure 3:
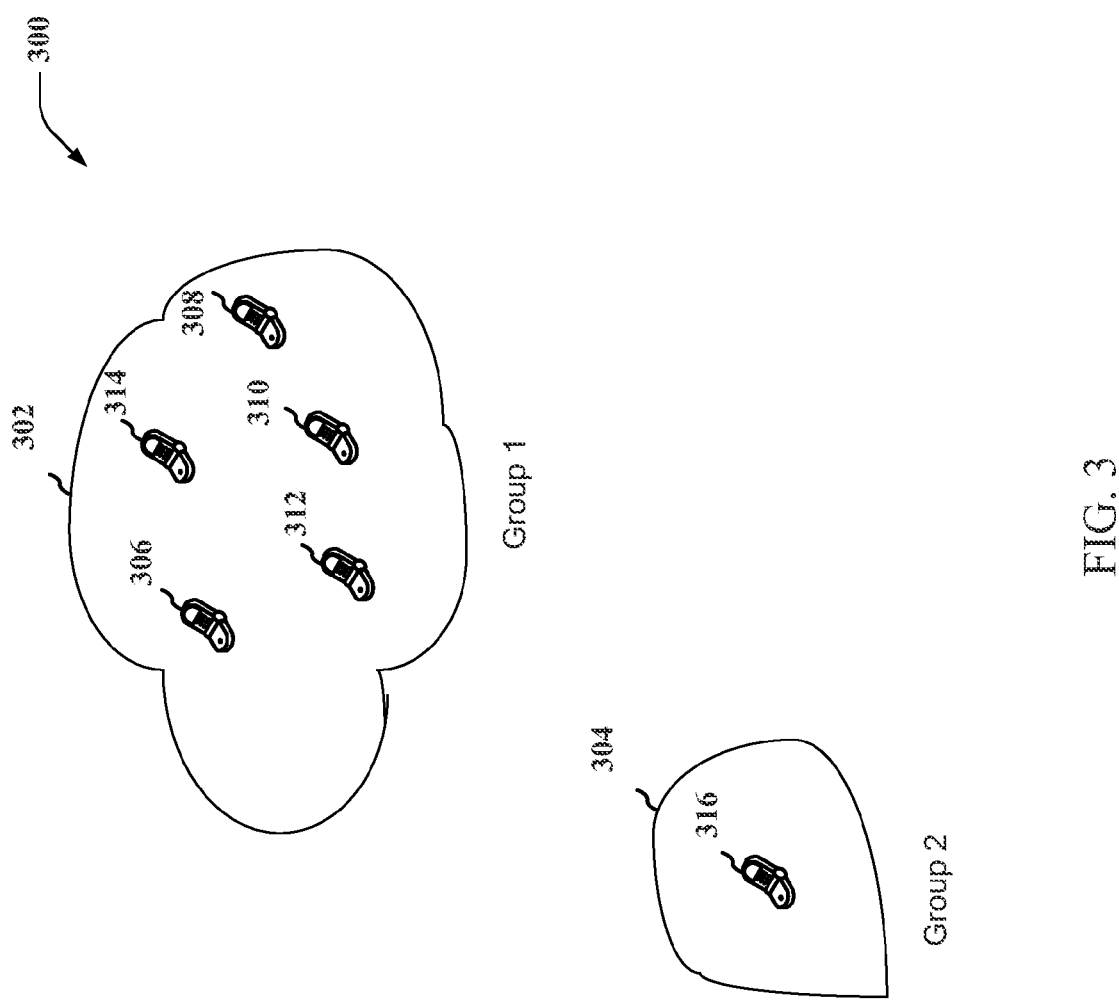
FIG. 3 shows a plurality of peer groups in accordance with an exemplary embodiment.

FIG. 3 shows a plurality of peer groups 300 in accordance with an exemplary embodiment. The plurality of peer groups 300 is comprised of a Group 1 302 peer group and a Group 2 304 peer group. Group 1 302 has five wireless devices 306, 308, 310, 312, 314 and Group 2 304 has a single wireless device 316.

The five wireless devices 306, 308, 310, 312, 314 are in proximity of one another and thus may monitor and receive timing signals transmitted from any other of the five wireless devices 306, 308, 310, 312, 314. As shown, the single wireless device 316 of Group 2 304 is far enough from Group 1 302 that timing signals from any one of the five wireless devices 306, 308, 310, 312, 314 of Group 1 may not be properly received. It can be appreciated that the five wireless devices 306, 308, 310, 312, 314 of Group 1 302 may be synchronized with each other according to a local clock and thus may establish synchronous communication links with each other. The single wireless device 316 in Group 2 304 may not be able to receive the timing signals from Group 1 302 and thus the single wireless device may not be able to reliably establish a synchronous communication link with any one of the five wireless devices 306, 308, 310, 312, 314 in Group 1.

Figure 4:
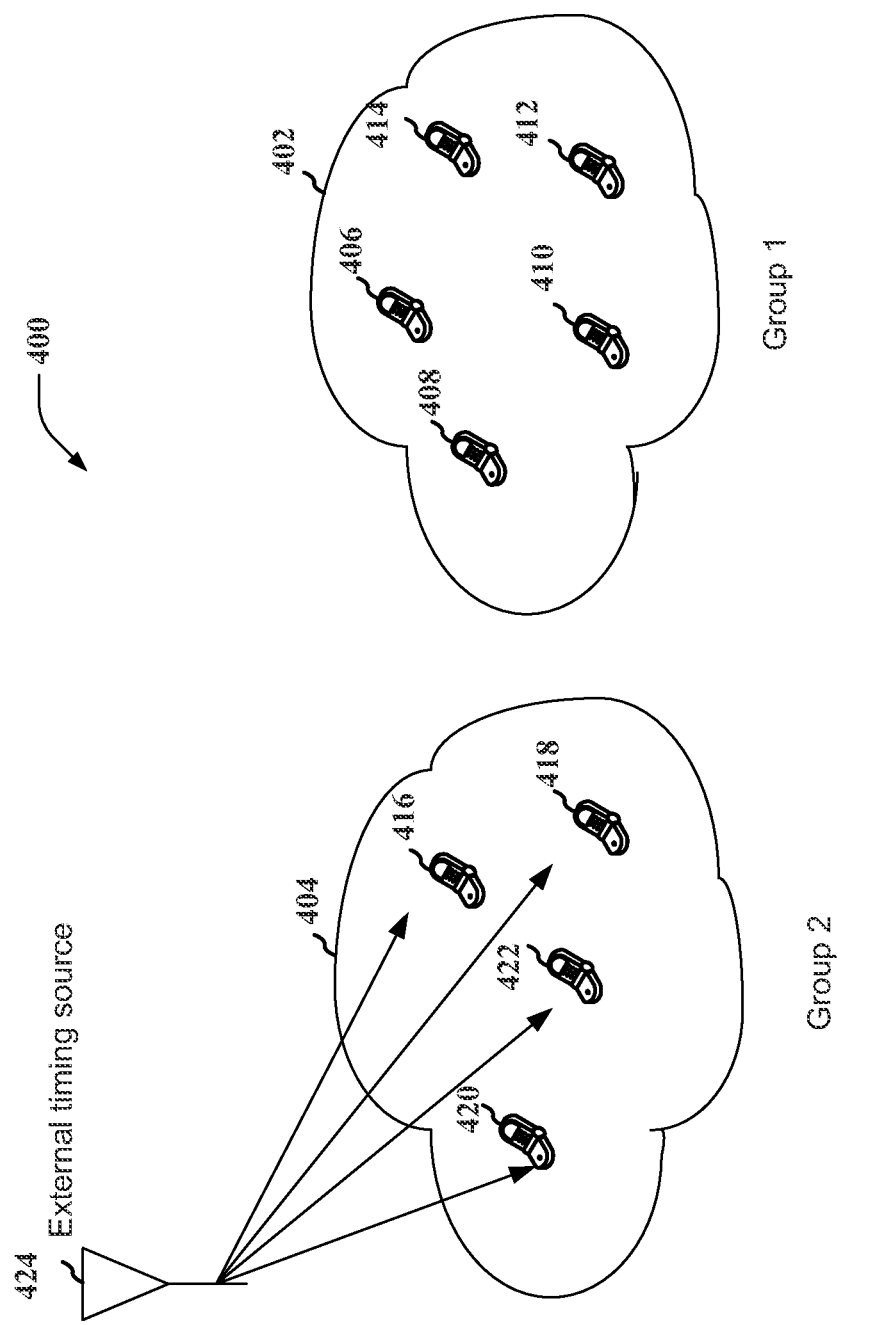
FIG. 4 shows a plurality of peer groups in accordance with a second exemplary embodiment.

FIG. 4 shows a plurality of peer groups 400 in accordance with a second exemplary embodiment. The plurality of peer groups 400 is comprised of a Group 1 402 peer group and a Group 2 404 peer group. Group 1 402 has five wireless devices 406, 408, 410, 412, 414 and Group 2 404 has four wireless devices 416, 418, 420, 422. An external timing source 424 broadcast timing signals to the four wireless devices 416, 418, 420, 422 in Group 2.

The five wireless devices 406, 408, 410, 412, 414 are in proximity of one another and thus they may monitor and receive timing signals transmitted from at least one of the other five wireless devices 406, 408, 410, 412, 414. The four wireless devices 416, 418, 420, 422 may receive timing from an external timing source 424 such as GPS, a CDMA base station, or other transmitting platform that can be used to derive timing information. The four wireless devices 416, 418, 420, 422 may also periodically transmit timing signals for other devices in the vicinity that do not have access to the external timing source 424.

As shown, the four wireless devices 416, 418, 420, 422 of Group 2 404 are far enough from Group 1 402 that timing signals from any one of the five wireless devices 406, 408, 410, 412, 414 of Group 1 cannot be received properly by the devices in Group 1 402. Similarly, the five wireless devices 406, 408, 410, 412, 414 of Group 1 402 far enough from Group 2 404 that timing signals from any one of the four wireless devices 416, 418, 420, 422 of Group 2 402 cannot be received properly by the devices in Group 1. In addition, the five wireless devices 406, 408, 410, 412, 414 are unable to synchronize with external timing source 424.

It can be appreciated that the five wireless devices 406, 408, 410, 412, 414 of Group 1 402 may be synchronized with each other through local timing signals and thus may establish synchronous communication links with each other. It can also be appreciated that the four wireless devices 416, 418, 420, 422 of Group 2 404 may be synchronized to the external timing source 424 allowing synchronous communication links to be established within Group 2 404. However, to establish a synchronous communication link between a wireless device of Group 1 402 and a wireless device of Group 2 the timing local timing signals of Group 1 should be synchronized with the external timing source.

Figure 5:
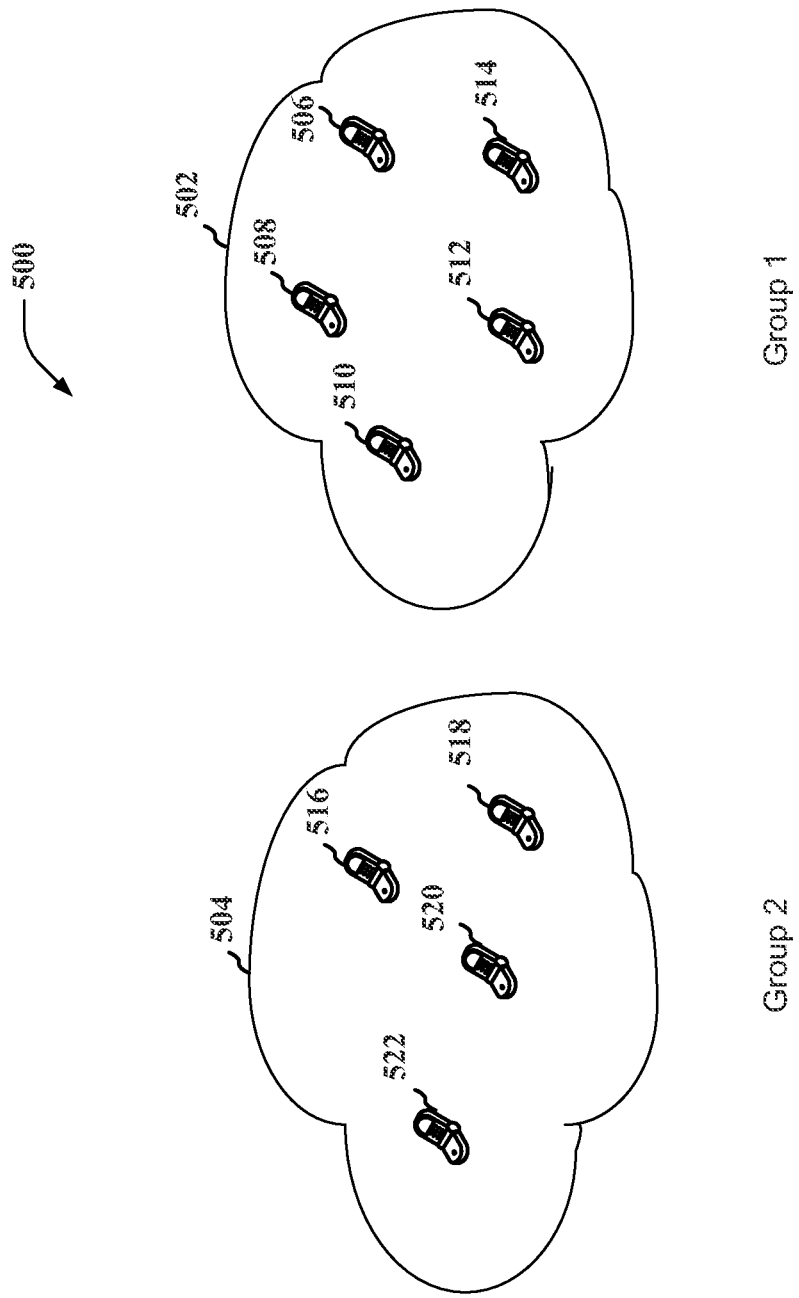
FIG. 5 shows a plurality of peer groups in accordance with a third exemplary embodiment.

FIG. 5 shows a plurality of peer groups 500 in accordance with a third exemplary embodiment. The plurality of peer groups 500 is comprised of a Group 1 502 peer group and a Group 2 504 peer group. Group 1 502 has five wireless devices 506, 508, 510, 512, 514 and Group 2 has four wireless devices 516, 518, 520, 522.

It can be appreciated that the five wireless devices 506, 508, 510, 512, 514 of Group 1 502 may be synchronized through local timing signals and thus the devices of Group 1 502 may establish synchronous communication links with each other. It can be appreciated that the four wireless devices 516, 518, 520, 522 of Group 2 504 may be synchronized through local timing signals and thus Group 2 may establish synchronous communication links with each other. However, to establish a synchronous communication link between a wireless device of Group 1 502 and a wireless device of Group 2 504 the Group 1 timing signals should be synchronized with the Group 2 timing signals.

Referring to FIG. 3-5 it is evident that when possible it may be desirable to have the devices of Group 1 synchronize with the devices of Group 2. This is possible if a timing signal from either Group 1 or Group 2 can be received by at least one wireless device in the other group. This may occur for example if at least one of the devices from Group 1 or 2 moves closer to the other group allowing the device to receive the other groups timing signal. The synchronizing Group 1 and Group 2 allows for the establishment of intergroup synchronous communication links and to the possibility of peer group merger.

Groups 1 and 2 may be synchronized with greater efficiency when at least one group has a plurality of devices. The plurality of devices may cooperate in the transmission of timing signals and/or in the search for timing signals. This may increases the groups timing signal footprint, provide greater fault tolerance and/or distribute the power burden among the plurality of devices in the group. In one embodiment, the devices in each peer group take turns in transmitting timing signals and/or take turns in searching for the timing signals. This spreads the power and bandwidth burden of transmitting and monitoring for timing signals over many devices.

Figure 6:
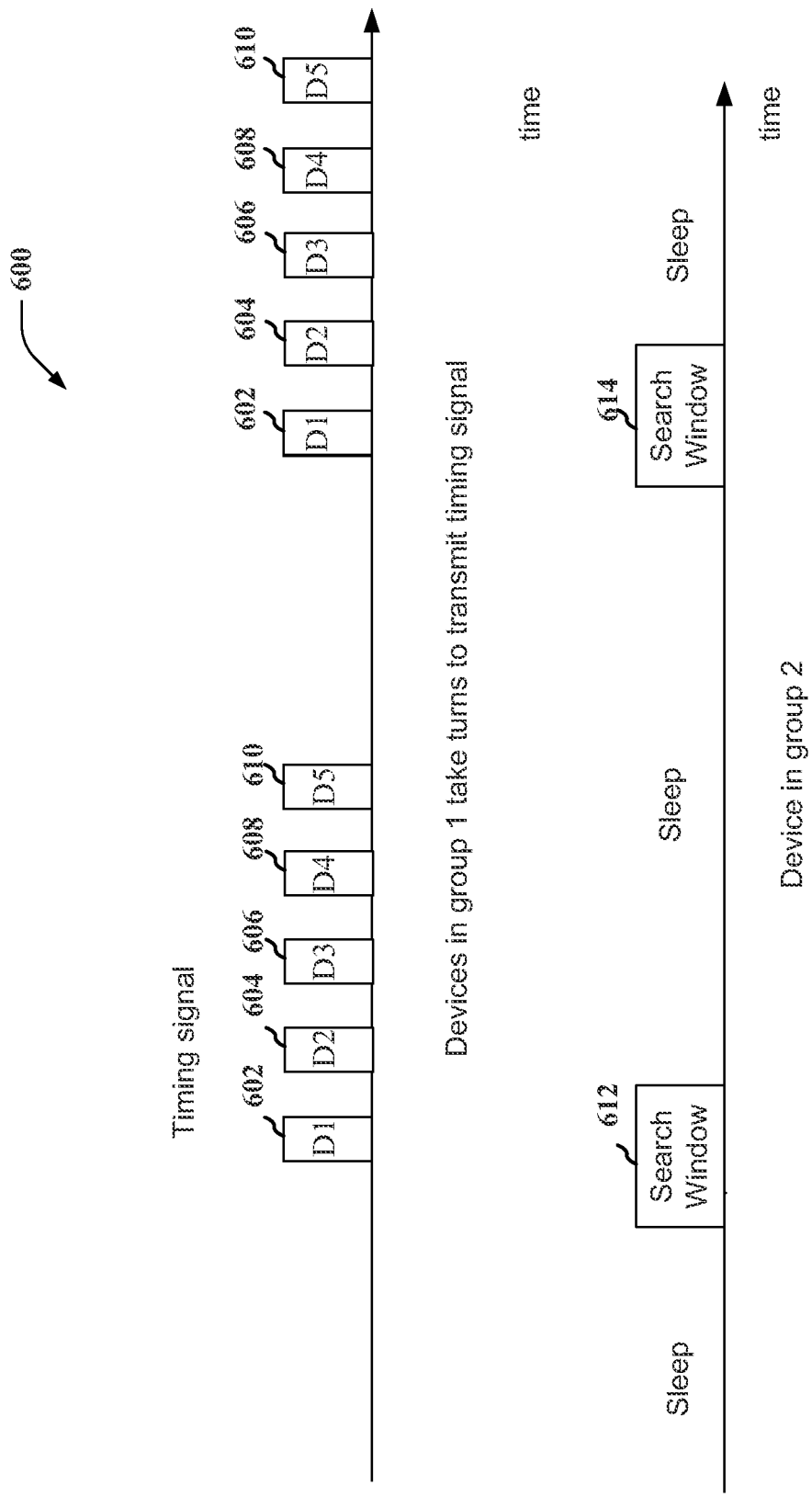
FIG. 6 shows a timing diagram for cooperatively transmitting timing signals in a peer group according to an exemplary embodiment.

FIG. 6 shows a timing diagram 600 for cooperatively transmitting timing signals in a peer group according to an exemplary embodiment. The overall timing signal is comprised of five periodic timing signals 602, 604, 606, 608, 610 transmitted by five respective wireless devices in Group 1. The wireless devices in group 2 periodically waken during a search window 612 to search for timing signals.

As shown, devices 1-5 share the responsibility of generating the overall timing signal comprised of the five periodic timing signals 602, 604, 606, 608, 610. The power burden is thus distributed over the five devices. Thus, a single device isn't burdened with providing all of the energy for the entire group. With multiple devices sharing the power burden, it may be practical to increase the number of timing pulses in a given time period allowing for shorter search windows 612 preserving energy in devices searching for a group timing signal.

In some embodiments of the invention, the devices in Group 1 adjust their transmit period based on the number of devices transmitting timing signals. The devices may periodically monitor for timing signals and estimate the number of devices transmitting timing signals and then adjust their period accordingly. In other embodiments, the devices may be instructed by a lead device as to when and at would rate they should transmit timing signals.

In still other embodiments, the devices may transmit timing signals pseudo-randomly or according to an ALOHA type protocol with a statistical period, dependent on the number of devices transmitting timing signals. In some embodiments, the time signal transmission may be slotted. In slotted embodiments, devices in Group 1 not transmitting a periodic signal may monitor for open timing transmission slots and begin transmitting in those slots.

In some embodiments the devices may transmit discovery signals with greater power or more total energy than data signals increasing the geographic footprint for discovery. In many cases, this may facilitate synchronization allowing devices to discover other wireless devices before receiving a timing signal. Discovery signals may also be used to estimate the number of wireless devices in the area or inside a peer group.

Figure 7:
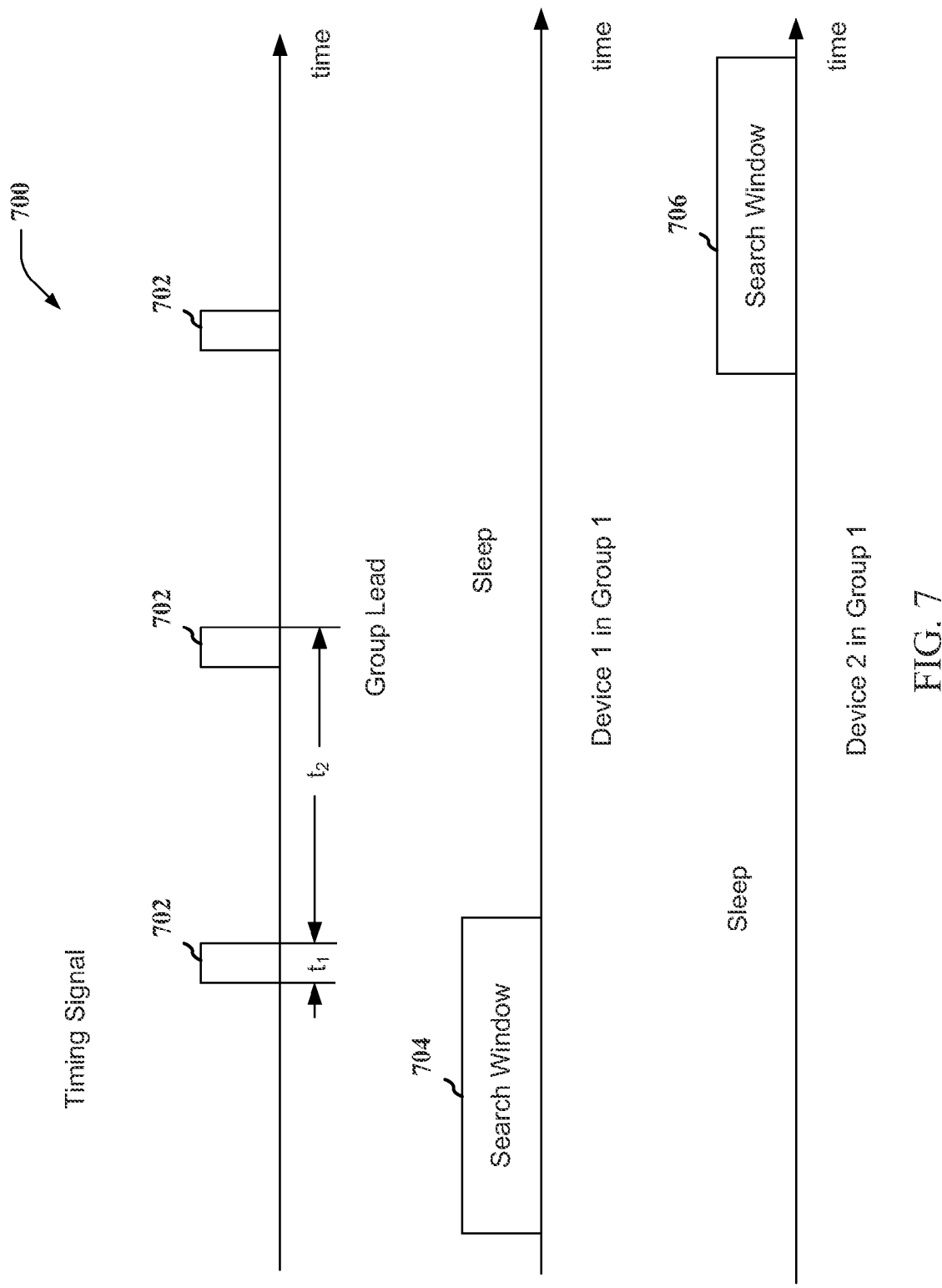
FIG. 7 shows a timing diagram for receiving timing signals in a peer group according to an exemplary embodiment.

FIG. 7 shows a timing diagram 700 for monitoring timing signals in a peer group according to an exemplary embodiment. The group lead or other device(s) transmits a timing signal 702. A first device in Group 1 wakens periodically during a first periodic search window 704 to search for the timing signal 702. A second device in Group 1 also wakens periodically during a second periodic search window 706 to search for timing signal 706.

As shown, device 1 and device 2 share the responsibility of searching for the timing signal. The search burden is thus distributed over the two devices allowing the two devices to search less frequently than if only one device was searching for the timing signal. The reduced search frequency preserves device energy. With two devices or more devices, sharing the search burden it may also be practical to increase the search window duration allowing for a decrease in the number of timing pulses in a given time period preserving energy in the device(s) transmitting timing signals.

In some embodiment of the invention, the devices in Group 1 adjust their search window period based on the number of devices searching for timing signals. In some embodiments, the devices may periodically estimate the number of devices searching for timing signals and then adjust their period accordingly.

In other embodiments, the devices may be instructed by a lead device as to when they should search for timing signals. In still other embodiments the devices may search for timing signals pseudo-randomly or according to an ALOHA type search protocol with the search window length and search sleep times statistically dependent on the number of devices searching for a timing signal.

Figure 8:
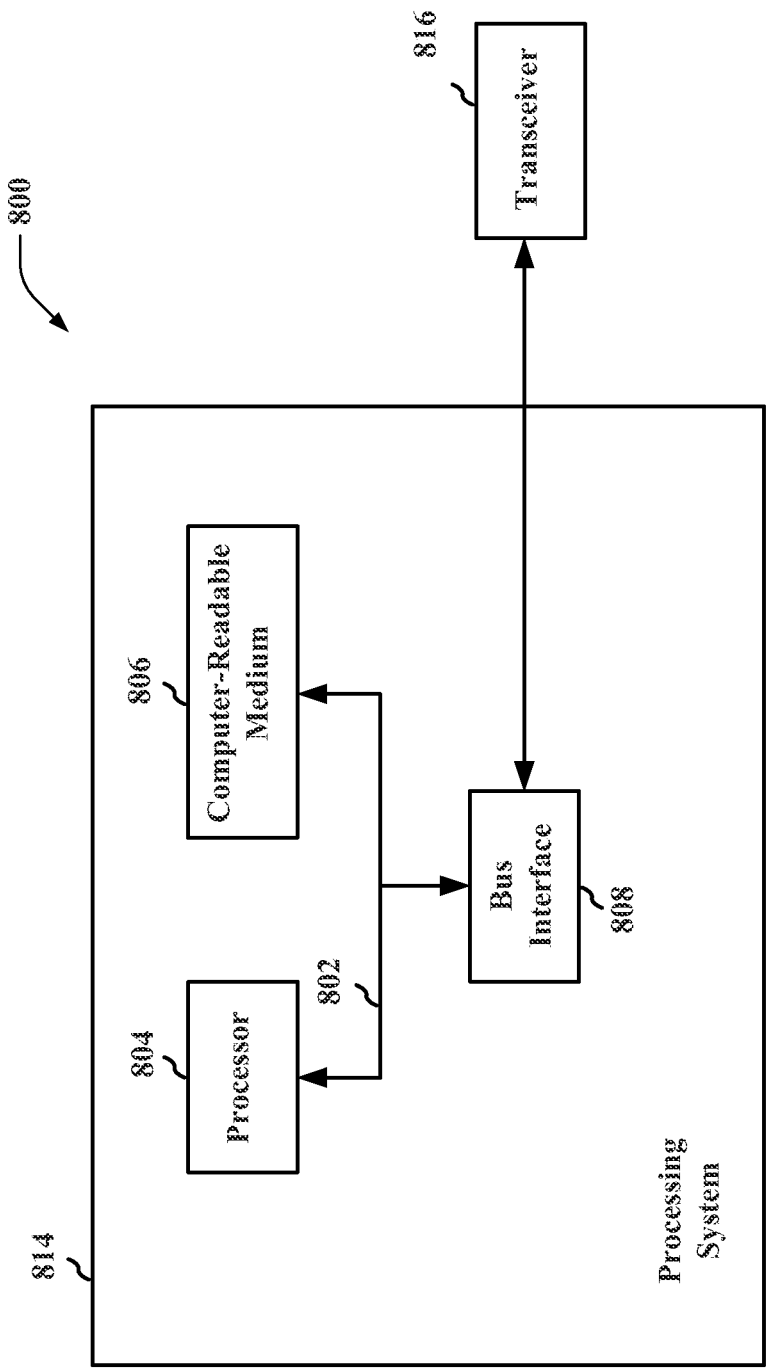
FIG. 8 shows a processing system according to an exemplary embodiment.

Referring to FIG. 7-8, those skilled in the art will recognize that it is possible to combine the techniques shown in these figures. That is, devices in a peer group may share the responsibility of transmitting a timing signal as shown in FIG. 7 and share the responsibility of monitoring for timing signals as shown in FIG. 8.

FIG. 8 is a conceptual diagram illustrating an example of a hardware implementation for an apparatus 800 employing a processing system 814. The processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors, represented generally by the processor 804, and computer-readable media, represented generally by the computer-readable medium 806. The bus 102 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a means for communicating with various other apparatuses over a transmission medium.

The processor 804 is responsible for managing the bus 802 and general processing, including the execution of software stored on the computer-readable medium 806. The software, when executed by the processor 804, causes the processing system 814 to perform the various functions described infra for any particular apparatus. The computer-readable medium 806 may also be used for storing data that is manipulated by the processor 804 when executing software. The processing system may be used to control a transceiver 816.

Figure 9:
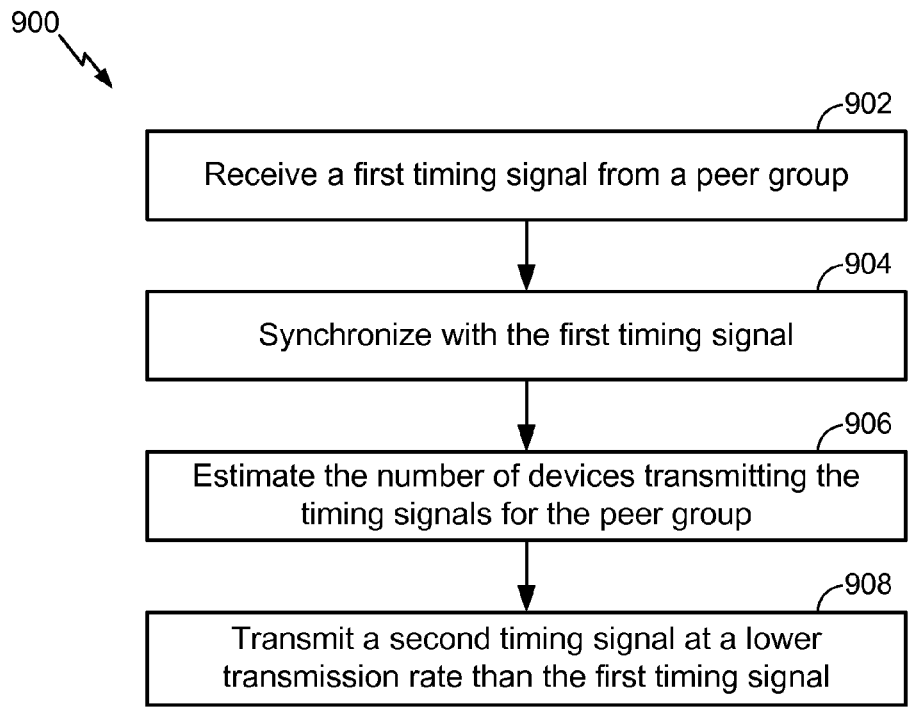
FIG. 9 shows a flow diagram for transmitting timing signals according to an exemplary embodiment.

FIG. 9 shows a flow diagram for transmitting timing signals according to an exemplary embodiment 900. A wireless device receives a first timing signal from a peer group. The wireless device determines if it is synchronized with the timing signal. If not, the device synchronizes with the first timing signal 904, synchronizing the device with other devices in the peer group. The device then estimates the number of devices transmitting timing signals in the peer group 906.

The device may estimate the number of devices transmitting timing signals in a variety of ways. For example, the device may monitor the timing signal and compare received energy levels of the timing signal. In some embodiments, the device may compare the phases of the received timing signals. In other embodiments, the timing protocol may define a timing wave pattern or period based on the number of devices transmitting the timing signal and the device may compare the pattern with the protocol. In another embodiment, the device may also receive an estimate of the number of devices transmitting the timing signal in a message or the estimate may be communicated in the timing signal itself. In some embodiments, the device may monitor peer discovery signal to estimate the number of devices in the peer group.

The device then transmits a second timing signal at a lower transmission rate than the first timing signal 908. The second timing signal effectively supplements the first timing signal. The device is thus contributing to the overall peer group timing signal. Peer group devices already transmitting timing signals may then decrease their timing signal transmission rates based on the additional contribution to the timing signal.

Figure 10:
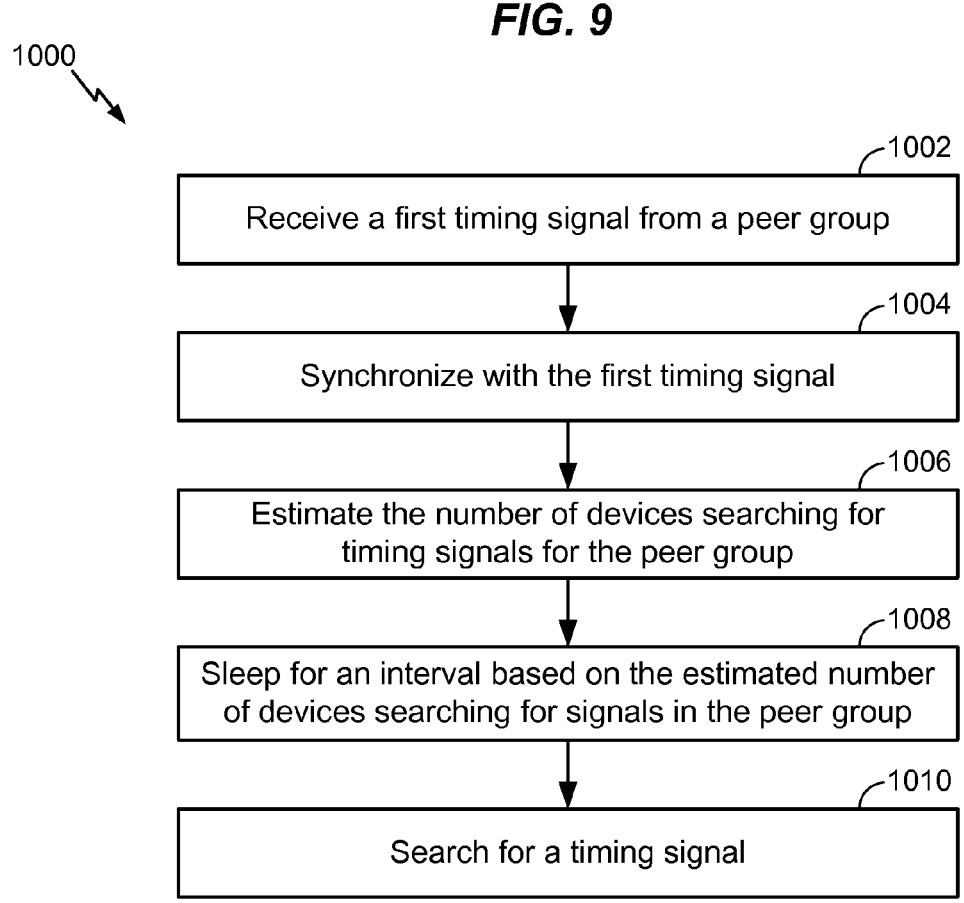
FIG. 10 show a flow diagram for receiving timing signals according to an exemplary embodiment.

FIG. 10 shows a flow diagram for receiving timing signals according to an exemplary embodiment. A device receives a first timing signal from a peer group 1002. The device then synchronizes with the first timing signal 1004. The device estimates the number of devices searching for timing signals in the peer group 1006.

The device may estimate the number of devices searching for signals in the peer group in a variety of ways. For example, another device in the peer group may transmit this information to the device. In another embodiment, the device may monitor the spectrum and estimate the number of devices based on spectral usage. In some embodiments, the device may monitor peer discovery signal to estimate the number of devices in the peer group.

If the device is also sharing responsibility for transmitting the timing signal the number of devices searching for timing signals may be estimated based on the number of devices transmitting timing signals. In one embodiment, the device may monitor the timing signal and compare received energy levels of the timing signal. In another embodiment, the device may compare the phases of the received timing signals. In a different embodiment, the timing protocol may also define a timing wave pattern or period based on the number of devices transmitting the timing signal and the device may compare the pattern with the protocol. In still another embodiment, the device may also receive an estimate of the number of devices transmitting the timing signal in a message or embedded in the timing signal itself.

The device may then sleep for interval based on the estimated number of devices searching for signals in the peer group 1008. Then, the device may search for a timing signal 1010. This sleep/search routine may be repeated indefinitely.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for synchronizing a first wireless device with a peer group, comprising:
receiving at the first wireless device a first timing signal transmitted at a first transmission rate from a second wireless device, the second wireless device being in the peer group;
synchronizing the first wireless device with the peer group using the received first timing signal;
estimating by the first wireless device a number of devices in the peer group that are transmitting timing signals;
determining a second transmission rate based on the number of devices in the peer group that are transmitting timing signals, the second transmission rate being lower than the first transmission rate; and transmitting from the first wireless device a second timing signal having the second transmission rate.

2. The method of claim 1 further comprising receiving a third timing signal transmitted from the second device at a third transmission rate, the third transmission rate being less than the first transmission rate.

3. The method of claim 2 wherein the second and third transmission rates are substantially the same transmission rate.

4. The method of claim 1 wherein the second timing signal is transmitted pseudo-randomly in time.

5. The method of claim 1, wherein prior to the transmitting from the first wireless device, an initial number of timing pulses, associated with the first timing signal, are transmitted within a time interval T, and after the transmitting from the first wireless device, a subsequent number of timing pulses, associated with the first and the second timing signal, are transmitted within the time interval T, and wherein the subsequent number is greater than the initial number.

6. The method of claim 1, wherein the estimating by the first wireless device a number of devices in the peer group that are transmitting timing signals further comprises:

receiving one or more timing signals from the devices, each said timing signal having a signal phase; and comparing a value of said signal phase among the one or more received timing signals.

7. An apparatus for synchronizing a first wireless device with a peer group, comprising:

a receiver for receiving at the first wireless device a first timing signal transmitted at a first transmission rate from a second wireless device, the second wireless device being in the peer group;

a processor for synchronizing the first wireless device with the peer group using the received first timing signal, the processor further adapted to:

estimate by the first wireless device a number of devices in the peer group that are transmitting timing signals;

determine a second transmission rate based on the number of devices in the peer group that are transmitting timing signals, the second transmission rate being lower than the first transmission rate;

and a transmitter for transmitting from the first wireless device a second timing signal having the second transmission rate.

8. The apparatus of claim 7 wherein the receiver is adapted to receive a third timing signal transmitted from the second device at a third transmission rate wherein the third transmission rate is less than the first transmission rate.

9. The apparatus of claim 7 wherein the second and third transmission rates are substantially the same transmission rate.

10. The apparatus of claim 7 wherein the second timing signal is transmitted in pseudo-randomly in time.

11. An apparatus for synchronizing a first wireless device with a peer group, comprising:

means for receiving at the first wireless device a first timing signal transmitted at a first transmission rate from a second wireless device, the second wireless device being in the peer group;

means for synchronizing the first wireless device with the peer group using the received first timing signal;

means for estimating by the first wireless device a number of devices in the peer group that are transmitting timing signals;

means for determining a second transmission rate based on the number of devices in the peer group that are transmitting timing signals, the second transmission rate being lower than the first transmission rate;

and means for transmitting from the first wireless device a second timing signal having the second transmission rate.

12. The apparatus of claim 11 further comprising means for receiving a third timing signal transmitted from the second device at a third transmission rate, the third transmission rate being less than the first transmission rate.

13. The apparatus of claim 12 wherein the second and third transmission rates are substantially the same transmission rate.

14. The apparatus of claim 11 wherein the second timing signal is transmitted pseudo-randomly in time.

15. A computer program product embodied on a non-transitory computer readable medium, the computer program product comprising:

instructions for receiving at the first wireless device a first timing signal transmitted at a first transmission rate from a second wireless device, the second wireless device being in the peer group;

instructions for synchronizing the first wireless device with the peer group using the received first timing signal;

instructions for estimating by the first wireless device a number of devices in the peer group that are transmitting timing signals;

instructions for determining a second transmission rate based on the number of devices in the peer group that are transmitting timing signals, the second transmission rate being lower than the first transmission rate;

and instructions for transmitting from the first wireless device a second timing signal having the second transmission rate.

* * * * *